United States Patent Office 3,136,690
Patented June 9, 1964

3,136,690
METHODS AND COMPOSITIONS FOR COMBATING PESTS WITH BETA-PHOSPHATE ESTERS OF -2-BUTENOATES OF MONO GLYCERIATE HETEROCYCLIC ACETALS AND GLYCERIATE CARBONATES
Ernst Beriger, Allschwil, Switzerland, assignor to Ciba Limited, Basel, Switzerland, a Swiss company
No Drawing. Original application Oct. 3, 1960, Ser. No. 59,811. Divided and this application Mar. 4, 1963, Ser. No. 282,917
Claims priority, application Switzerland Oct. 12, 1959
10 Claims. (Cl. 167—33)

The present invention relates to the combating of insect and acaride pests, and to compositions therefor.

This invention employs organic compounds of the general formula

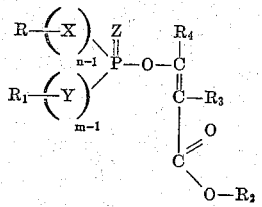

in which R and $R_1$ each represent an alkyl, cycloalkyl, aralkyl, aryl or heterocyclic radical which may be substituted, or R and $R_1$ may together form part of a ring system, $R_2$ represents a heterocyclic radical containing at least one oxygen atom as a ring hetero-atom, $R_3$ represents a hydrogen atom or an alkyl radical or a halogen atom, $R_4$ represents an aliphatic, alicyclic, aromatic or heterocyclic radical, X and Y each represent an —O—, —S—, —NH— or

bridge, Z represents an oxygen or sulphur atom, and $n$ and $m$ each represents the whole number 1 or 2.

The compounds of the above formula are valuable substances for combating pests, especially insect and acaride pests. They are active against the various stages of development, such as eggs, larvae and imagines, and they act as contact and stomach poisons. Especially valuable as insecticides are compounds of the general formula

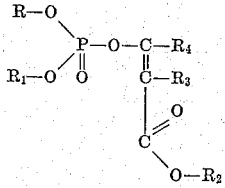

in which R and $R_1$ each represent a lower alkyl radical containing 1 to 4 carbon atoms, $R_2$ represents a tetrahydrofurfuryl radical or the radical of cyclic acetalized glycerine, $R_3$ represents a hydrogen atom or chlorine atom and $R_4$ represents an alkyl radical of low molecular weight or a phenyl radical which may be substituted.

Copending application, Serial No. 59,811, filed October 3, 1960, of which the present application is a division, provides a process for the manufacture of the compounds of the above general formula wherein a compound of the formula

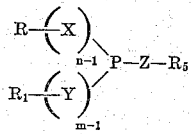

in which R, $R_1$, $n$, $m$, X, Y and Z have the meanings given above, and $R_5$ represents an alkyl radical containing 1 to 4 carbon atoms, is condensed with a compound of the general formula

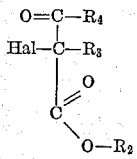

in which $R_2$, $R_3$ and $R_4$ have the meanings given above, and Hal represents a halogen atom, such as a bromine or advantageously a chlorine atom, with the splitting-off of a compound of the formula $R_5$—Hal.

The new compounds can also be made by reacting a compound of the formula

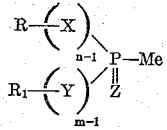

in which R, $R_1$, $n$, $m$, X, Y and Z have the meanings given above, and Me represents an alkali metal, advantageously sodium, with a compound of the formula

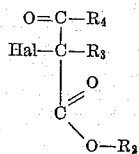

in which $R_2$, $R_3$, $R_4$ and Hal have the meanings given above. Compounds, in which $R_3$ represents a hydrogen atom or an alkyl radical, can also be made by the following condensation

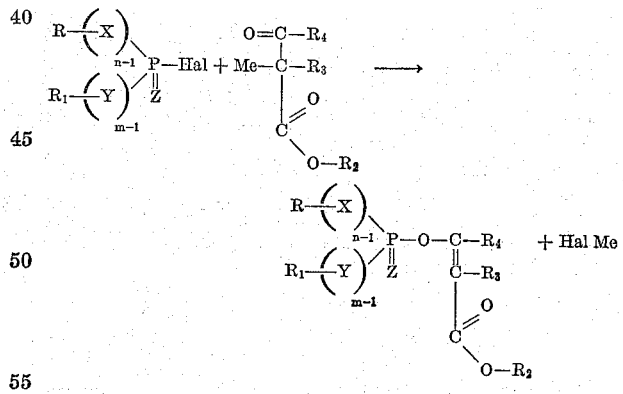

Which of the organic reactions is to be chosen in a particular case depends on the ease with which the starting materials can be obtained.

The starting materials of the general formula

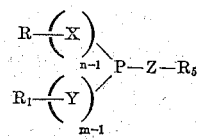

are derivatives of trivalent phosphorus, whereas the compounds of the invention are derivatives of pentavalent phosphorus.

Among the compounds of the above formula those are most easily obtainable in which the symbols X, Y and Z are oxygen atoms. They correspond to the general formula

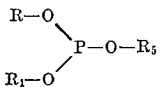

and can be made by methods in themselves known.

The aliphatic radicals, which the symbols R and $R_1$ may represent may have straight or branched chains and be saturated or unsaturated. They may also be substituted, for example, by methyl, ethyl, propyl, isopropyl, butyl, hexyl, 2-ethyl-butyl, octyl, 2-butyl-octyl, dodecyl, octadecyl, allyl and 2-chlorethyl groups, and radicals containing thiocyano, cyano or ester groups. The radicals R and $R_1$, may be identical or different, $R_5$ is advantageously an alkyl radical containing 1 to 4 carbon atoms. As examples there may be mentioned the following compounds: trimethyl phosphite, triethyl phosphite, tripropyl phosphite, diethyl dodecyl phosphite, tri-(2-chlorethyl)-phosphite, or the ester of the formula

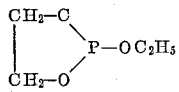

The aromatic radicals, which R and $R_1$ may represent, may be mononuclear or polynuclear and may bear nuclear substituents. As such aromatic radicals there may be mentioned, for example, phenyl, 2- or 4-chlorophenyl, 2:4-dichlorophenyl, 4-methoxyphenyl, 4-nitrophenyl, naphthyl and 4-diphenyl groups. There may be mentioned compounds such as 2:4-dichlorophenyl-diethyl phosphite and 4-chlorophenyl-dimethyl-phosphite. There may also be mentioned compounds in which one or two radicals are bound directly or through a carbon atom to the phosphorus atom, for example, phenyl-phosphorous acid diethyl ester of the formula

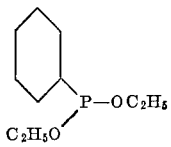

Among the araliphatic radicals which R and $R_1$ may represent there may be mentioned the benzyl group, and among cycloaliphatic radicals there may be mentioned the cyclohexyl group, and among heterocyclic radicals there may be mentioned the tetrahydrofurfuryl group. Starting materials containing such radicals are, for example, cyclohexyl diethyl phosphite, tetrahydrofurfuryl dimethyl phosphite and dibenzyl propyl phosphite.

Among compounds in which X and Y represent sulphur atoms, there may be mentioned triethyl thiophosphite of the formula

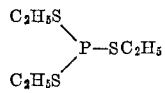

and among those in which X and Y represent nitrogen atoms, there may be mentioned the compound of the formula

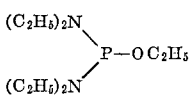

The compounds of the general formula

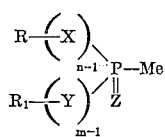

are salts of disubstituted phosphites or of phosphinic acids, for example, the sodium salt of dimethyl phosphite, of diethyl phosphite, of dodecyl ethyl phosphite, or cyclohexylmethyl phosphite, of tetrahydrofurfuryl ethyl phosphite or of benzyl ethyl phosphite.

The compounds of the general formula

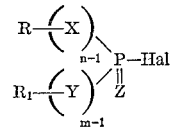

are phosphoric acid monohalides, for example, the phosphoric acid diethyl ester monochloride, thiophosphoric acid diethyl ester monochloride, or bis-dimethylamidophosphoric acid monochloride.

The compounds of the general formula

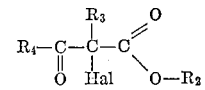

are esters of halogenated acyl acetic acids derived from aliphatic, alicyclic, aromatic or heterocyclic carboxylic acids, and advantageously aceto-acetic, benzoyl-acetic, hexahydrobenzoyl-acetic, furoyl-acetic or tetrahydrofuroyl acetic acid, such acids being esterified with alcohols which contain a heterocyclic radical containing at least one oxygen atom as a ring hetero atom.

The radical $R_3$ may be a halogen atom, and preferably a chlorine atom, or a hydrogen atom or an alkyl radical advantageously containing 1 to 4 carbon atoms, such as the methyl group. $R_4$ may represent a heterocyclic radical, such as the furfuryl group or tetrahydrofurfuryl group, or an aryl radical, for example, the phenyl, chlorophenyl or nitrophenyl group, or a cycloalkyl radical such as the cyclohexyl group, or an alkyl radical, such as the methyl or ethyl group. As alcohols, which provide the radical $R_2$, there may be mentioned tetrahydrofurfuryl alcohol, and also at least trihydric alcohols, such as glycerine or pentaerythritol, in which at least three hydroxyl groups are bound together in a ring by acetal formation with an aldehyde such as formaldehyde, acetaldehyde, benzaldehyde and crotonaldehyde, or a ketone such as acetone, methyl isobutyl ketone, acetophenone.

The products of the invention are made by heating the reaction components, for example, at a temperature within the range of 50° C. to 200° C. and advantageously about 90° C. to 150° C. It may be of advantage to work in an inert solvent, such as benzene, toluene, xylene, chlorobenzene or benzine, and, if desired, in an inert gaseous atmosphere, for example, under nitrogen, and/or under reduced pressure.

As stated above, the compounds of the invention are valuable agents for combating pests. The invention, therefore, provides preparations for combating pests, which comprise as active substance such a compound in admixture with a solid, gaseous, or liquid diluent.

There are advantageously used compounds of the above general formula

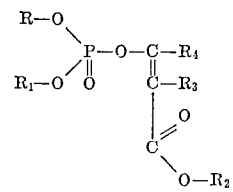

in which R, $R_1$, $R_2$, $R_3$ and $R_4$ have the meanings given above in connection with that formula.

A very wide variety of materials can be protected against pests, and gaseous or liquid or solid substances may be used as carriers for the active substance. As such materials to be protected and carriers there may be mentioned, for example, the air, especially in rooms, or liquids, for example, the water in ponds, or any dead or living solid substrata, for example, any objects in living rooms, cellars, attics, stables, and also pelts, feathers, wool or the like, living organisms of the vegetable and animal kingdoms, in all their various stages of development, provided that they are not sensitive to the pest combating agents.

The compounds can be used for combating pests by the usual methods, for example, by treating the materials to be protected with the active compound in the form of vapour, for example, by using it as a fumigating preparation, or the compound may be made up in the form of a dusting or spraying preparation, for example, as a solution or suspension, in admixture with water or an organic solvent, for example, alcohol, petroleum, a tar distillate or the like. Aqueous solutions of the active compounds or aqueous emulsions of organic solvents which contain the active compounds, may be used to protect objects by brushing, spraying or immersion.

The spraying and dusting preparations may contain the usual inert fillers or marking agents, for example, kaoline, gypsum or bentonite, or other additions, such as sulphite cellulose waste liquor, cellulose derivatives and the like, or the usual wetting agents or adhesive agents may be incorporated for improving the wetting power and adhesion of the preparations. The preparations may be made up in powder form, in the form of aqueous dispersions or pastes or in the form of self-dispersing oils.

The compounds may be present in the preparations as the sole active substances, or they may be present in admixture with other insecticides and/or fungicides. The preparations can be used for plant protection by the usual spraying, watering, dusting or fumigating methods.

The following examples illustrate the invention, the parts and percentages being by weight unless otherwise stated, and the relationship of parts by weight to parts by volume being the same as that of the kilogram to the liter.

*Example 1*

A mixture of 23.6 parts of α-chloracetoacetic acid glycerol carbonate ester (acetoacetic acid glycerol carbonate ester, not distillable in a high vacuum. *Analysis.*—Calculated: C, 47.53%; H, 4.99%. Found: C, 47.60%; H, 5.01%) and 25 parts by volume of chlorobenzene is treated at the boil within 5 minutes with 13.7 parts of trimethyl phosphite. To complete the reaction, the mixture is heated for one hour longer at 135° C., after which time 3.7 parts of methyl chloride have collected in a cooled receptacle. The volatile constituents are removed in vacuo, to leave as residue 30.45 parts of the compound of the formula $$(CH_3O)_2\overset{O}{\overset{\|}{P}}-O\overset{CH_3}{\overset{|}{C}}=\overset{H}{\overset{|}{C}}-COOCH_2\overset{O}{\overset{/\ \backslash}{C}H}\overset{C=O}{\underset{CH_2}{\overset{|}{\ }}}$$

*Analysis.*—Calculated: P, 9.99%. Found: P, 9.6%.

*Example 2*

16.4 parts of α-chloracetoacetic acid glycerol carbonate ester in 25 parts by volume of chlorobenzene are reacted with 14.5 parts of triethyl phosphite as described in Example 1, to yield 23.8 parts of a compound of the formula $$(C_2H_5O)_2\overset{O}{\overset{\|}{P}}-O\overset{CH_3}{\overset{|}{C}}=\overset{H}{\overset{|}{C}}-COOCH_2\overset{O}{\overset{/\ \backslash}{C}H}\overset{C=O}{\underset{CH_2}{\overset{|}{\ }}}$$

*Analysis.*—Calculated: P, 9.16%. Found: P, 8.7%.

*Example 3*

18.9 parts of α-chloracetoacetic acid tetrahydrofurfuryl ester (acetoacetic acid tetrahydrofurfuryl ester, boiling at 102° C. under 0.01 mm. Hg) are heated in 25 parts by volume of chlorobenzene to the boil and 11.7 parts of trimethyl phosphite are added dropwise. The mixture is then heated for another hour at 140° C., after which time 3.6 parts of methyl chloride have collected in a cooled receptacle. The volatile constituents are removed in vacuo at a bath temperature of 90° C. The residue (23.6 parts) can be distilled in a high vacuum. The compound boils at 156° C. under 0.04 mm. Hg pressure and corresponds to the formula $$(CH_3O)_2\overset{O}{\overset{\|}{P}}-O\overset{CH_3}{\overset{|}{C}}=\overset{H}{\overset{|}{C}}-COOCH_2-\overset{CH_2-CH_2}{\overset{|\qquad\ |}{CH\ \ \ \ CH_2}}\overset{}{\underset{O}{\backslash\ /}}$$

*Example 4*

By reacting 18.9 parts of α-chloracetoacetic acid tetrahydrofurfuryl ester in 25 parts by volume of chlorobenzene with 15.6 parts of triethyl phosphite as described in Example 3, there are obtained 26.8 parts of the compound of the formula $$(C_2H_5O)_2\overset{O}{\overset{\|}{P}}-O\overset{CH_3}{\overset{|}{C}}=\overset{H}{\overset{|}{C}}-COOCH_2-\overset{CH_2-CH_2}{\overset{|\qquad\ |}{CH\ \ \ \ CH_2}}\overset{}{\underset{O}{\backslash\ /}}$$

boiling at 134–140° C. under 0.06 mm. Hg pressure.
*Analysis.*—Calculated: P, 9.61%. Found: P, 9.62%.

*Example 5*

19.4 parts of a mixture of α-chloroacetoacetic acid esters of glycerol corresponding to the formulae $$CH_3-\overset{O}{\overset{\|}{C}}-\overset{Cl}{\overset{|}{C}H}-\overset{O}{\overset{\|}{C}}-O-\overset{}{C}H\overset{CH_2-O}{\underset{CH_2-O}{\overset{/}{\backslash}\ \overset{\backslash}{/}}}CH_2$$

and $$CH_3-\overset{O}{\overset{\|}{C}}-\overset{Cl}{\overset{|}{C}}-HC-O-CH_2\ \ HC-O\ \backslash\ CH_2\ H_2C-O\ /$$

boiling at 115° C. under 0.02 mm. Hg pressure, said mixture being represented by the formula $$CH_3-\overset{O}{\overset{\|}{C}}-\overset{Cl}{\overset{|}{C}}-H-\overset{O}{\overset{\|}{C}}-OC_3H_5\overset{O}{\underset{O}{\overset{/\ \backslash}{\ \ \ \ \ }}}CH_2$$

are heated at the boil in 25 parts by volume of chlorobenzene. In the course of 5 minutes 11.9 parts of trimethyl phosphite are added dropwise. The bath is then maintained for one hour at 140–150° C., after which time 3.8 parts of methyl chloride have collected in a cooled receptacle. The volatile constituents are removed in vacuo at a bath temperature of 90° C., to leave as residue 25.3 parts of a mixture of esters as a yellow oil of the formula $$(CH_3O)_2\overset{O}{\overset{\|}{P}}-O\overset{CH_3}{\overset{|}{C}}=\overset{H}{\overset{|}{C}}-COOC_3H_5\overset{O}{\underset{O}{\overset{/\ \backslash}{\ \ \ \ \ }}}CH_2$$

boiling at 152–154° under 0.05 mm. Hg pressure.
*Analysis.*—Calculated P, 10.46%. Found P, 10.2%.

*Example 6*

19.4 parts of α-chloracetoacetic acid methylene glycerol ester in 25 parts by volume of chlorobenzene are reacted with 15.9 parts of triethyl phosphite as described in Example 5, to yield the product of the formula $$(C_2H_5O)_2\overset{O}{\overset{\|}{P}}-O\overset{CH_3}{\overset{|}{C}}=\overset{H}{\overset{|}{C}}-COOC_3H_5\overset{O}{\underset{O}{\overset{/\ \backslash}{\ \ \ \ \ }}}CH_2$$

boiling at 161–164° C. under 0.03 mm. Hg pressure.

*Example 7*

22.35 parts of α,α-dichloracetoacetic acid methylene glycerol ester in 25 parts by volume of chlorobenzene are reacted with 11.9 parts of trimethyl phosphite as described in Example 5, to yield the product of the formula $$(CH_3O)_2\overset{O}{\underset{\|}{P}}-O\overset{CH_3}{\underset{|}{C}}=\overset{Cl}{\underset{|}{C}}-COOC_3H_5\overset{O}{\underset{\diagdown O \diagup}{\diagup}}CH_2$$

boiling at 161–171° C. under 0.1–0.25 mm. Hg pressure.
*Analysis.*—Calculated P, 9.37%. Found P, 9.5%.

Example 8

23.5 parts of α-chloracetoacetic acid isopropylidene glycerol ester (acetoacetic acid isopropylidene glycerol ester; B.P. 102–108° C. under 0.04 mm. Hg) in 25 parts by volume of chlorobenzene are reacted with 12.8 parts of trimethylphosphite as described in Example 5, to yield 29.9 parts of the compound of the formula $$(CH_3O)_2\overset{O}{\underset{\|}{P}}-O\overset{CH_3}{\underset{|}{C}}=\overset{H}{\underset{|}{C}}-COOCH_2CH-O\overset{CH_2-O}{\underset{}{}}\diagdown\overset{CH_3}{\underset{CH_3}{C}}\diagup$$

boiling at 150–157° C. under 0.03 mm. Hg pressure.

Example 9

23.5 parts of α-chloracetoacetic acid isopropylidene glycerol ester in 25 parts by volume of chlorobenzene are reacted with 17.2 parts of triethyl phosphite as described in Example 5, to yield 32.7 parts of the compound of the formula $$(C_2H_5O)_2\overset{O}{\underset{\|}{P}}-O\overset{CH_3}{\underset{|}{C}}=\overset{H}{\underset{|}{C}}-COOCH_2CH-O\overset{CH_2-O}{\underset{}{}}\diagdown\overset{CH_3}{\underset{CH_3}{C}}\diagup$$

boiling at 151–157° C. under 0.3 mm. Hg pressure.

Example 10

27.5 parts of α,α-dichloracetoacetic acid isopropylidene glycerol ester in 25 parts by volume of chlorobenzene are reacted with 13.2 parts of trimethyl phosphite as described in Example 5, to yield 34.3 parts of the compound of the formula $$(CH_3O)_2\overset{O}{\underset{\|}{P}}-O\overset{CH_3}{\underset{|}{C}}=\overset{Cl}{\underset{|}{C}}-COOCH_2CH-O\overset{CH_2-O}{\underset{}{}}\diagdown\overset{CH_3}{\underset{CH_3}{C}}\diagup$$

boiling at 164–170° C. under 0.25 mm. Hg pressure.

Example 11

27.5 parts of α,α-dichloracetoacetic acid isopropylidene glycerol ester in 30 parts by volume of chlorobenzene are reacted with 17.6 parts of triethyl phosphite as described in Example 5, to yield 37.7 parts of the compound of the formula $$(C_2H_5O)_2\overset{O}{\underset{\|}{P}}-O\overset{CH_3}{\underset{|}{C}}=\overset{Cl}{\underset{|}{C}}-COOCH_2CH-O\overset{CH_2-O}{\underset{}{}}\diagdown\overset{CH_3}{\underset{CH_3}{C}}\diagup$$

boiling at 163–170° C. under 0.1 mm. Hg pressure.

Example 12

2 parts of the condensation products obtained as described in Examples 1 to 11 are mixed with 1 part of the condensation product from 1 mol of tertiary octylphenol and 8 mols of ethylene oxide, and with 7 parts of isopropanol. In each case a clear solution is obtained which can be used as a spray concentrate and can be emulsified by being poured into water.

(*a*) To measure the contact effect of the solution on aphids the following experiment was carried out with the use of spray liquids containing 0.08%, 0.04%, 0.02% and 0.01% of active principle respectively.

Broad beans strongly infested with aphids were sprayed all over and after 48 hours the effect was inspected.

The results obtained in this manner are summarized in the following table:

| Spray concentration | Effect on aphids after 48 hours | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| 0.08% | ++ | ++ | ++ | ++ | ++ | ++ | ++ | ++ | ++ | ++ | ++ |
| 0.04% | ++ | ++ | ++ | ++ | ++ | ++ | ++ | ++ | ++ | ++ | ++ |
| 0.02% | ++ | ++ | ++ | ++ | ++ | ++ | ++ | ++ | ++ | ++ | ++ |
| 0.01% | ++ | ++ | ++ | ++ | ++ | ++ | ++ | ++ | ++ | ++ | ++ |

For each plant a reference mark is used: (+) signifies that no live aphids are left (−) signifies insufficient or no effect, and (′) signifies good effect, only a few aphids left alive.

(*b*) To establish the effect on aphids by diffusion through the leaves the following experiment was carried out with spray liquors containing 0.08%, 0.04%, 0.02% and 0.01% of active principle respectively.

Of broad beans of which only the underside of the leaves were infested with aphids, only the upper surface of the leaves was treated with the aforementioned spray liquors and after 48 hours the effect on the sprayed underside was inspected. The results obtained are summarized in the following table:

| Spray concentration | Effect on aphids | | | | | | | | | | |
|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| 0.08% | ++++ | ---- | ++++ | ++++ | ++++ | ++++ | ++++ | ++++ | ++++ | ++++ | ++++ |
| 0.04% | ++++ | ---- | ++++ | ++++ | ++++ | ++++ | ++++ | ++++ | ++++ | ++++ | ++++ |
| 0.02% | ++++ | ---- | ++++ | ++++ | ++++ | ++++ | ++++ | +′′− | ′′−− | ++′′ | ---- |
| 0.01% | ++++ | ---- | ++++ | ++++ | ++++ | ++++ | ++++ | +′′− | ′′−− | +−−− | ---- |

(*c*) To determine the inner-therapeutic, so-called systemic, effect the following experiment was carried out with spray liquors containing 0.08%, 0.04%, 0.02% and 0.01% of active principle respectively.

From broad beans (*Vicia fabae*), strongly infested with aphids (*Doralis fabae*), the lower leaves were removed and colored markings were made halfway up the stem. The lower halves of the stem of two plants each were then sprayed with the spray liquors of the concentrations mentioned above. After 48 hours the effect on aphids in the upper, unsprayed portion of the plants was inspected. The results obtained are summarized in the following table:

| Spray concentration | Effect on aphids after 48 hours | | | | |
|---|---|---|---|---|---|
| | Ex. 3 | Ex. 4 | Ex. 5 | Ex. 6 | Ex. 9 |
| 0.08% | ++ | ++ | ++ | ′ ′ | ++ |
| 0.04% | ++ | ′ ′ | ++ | ′ ′ | — |
| 0.02% | ++ | ′ ′ | ++ | ′ ′ | — |
| 0.01% | ++ | ′ ′ | ++ | ′ ′ | — |

The compounds obtained as described in Examples 1 to 11 are also efficient acaricides, for example towards red spider mite. Furthermore, the compounds act well to excellently as stomach poisons in the case of the housefly (*Musca domestica*) and *Gastroidea viridula* and have a good ovicidal action on the eggs of *Ephestia kuhniella*.

The spray concentrates can also be prepared with wetting and emulsifying agents other than the one mentioned above. There may be used non-ionic products, for example condensation products of aliphatic alcohols, amines or carboxylic acids containing a long-chain hydrocarbon residue of about 10 to 30 carbon atoms with ethylene oxide, such as the condensation products of octadecyl alcohol with 25 to 30 mols of ethylene oxide, soybean fatty acid with 30 mols of ethylene oxide, commercial oleylamine with 15 mols of ethylene oxide, or dodecylmercaptan with 12 mols of ethylene oxide.

Among the suitable anionic emulsifiers there may be mentioned the sodium salt of dodecylalcohol sulphonic acid ester, the sodium salt of dodecylbenzenesulphonic acid, the potassium or triethanolamine salt of oleic acid or of abietic acid or of mixtures of said acids or the sodium salt of a petroleumsulphonic acid.

What is claimed is:

1. An aqueous spraying preparation for combating insect and acaride pests, which comprises 2 parts of a phosphorus compound in admixture with 1 part of the condensation product from 1 mol of tertiary octyl phenol and 8 mols of ethylene oxide, and with 7 parts of isopropanol, the said phosphorus compound being of the formula

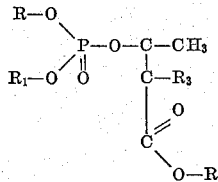

in which R and R$_1$ each is alkyl with 1 to 4 carbon atoms, R$_2$ is a member selected from the group consisting of tetrahydrofurfuryl,

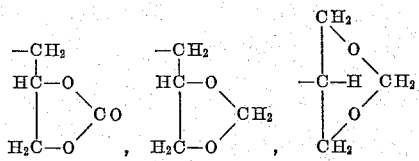

and

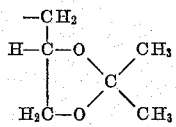

and R$_3$ represents a member selected from the group consisting of H and Cl.

2. An aqueous spraying preparation for combating insect and acaride pests, which comprises 2 parts of a phosphorus compound in admixture with 1 part of the condensation product from 1 mol of tertiary octyl phenol and 8 mols of ethylene oxide, and with 7 parts of isopropanol, the said phosphorus compound being of the formula

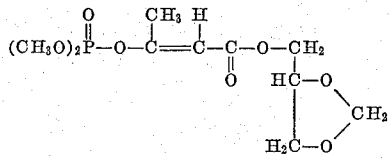

3. An aqueous spraying preparation for combating insect and acaride pests, which comprises 2 parts of a phosphorus compound in admixture with 1 part of the condensation product from 1 mol of tertiary octyl phenol and 8 mols of ethylene oxide, and with 7 parts of isopropanol, the said phosphorus compound being of the formula

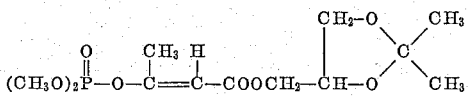

4. An aqueous spraying preparation for combating insect and acaride pests, which comprises 2 parts of a phosphorus compound in admixture with 1 part of the condensation product from 1 mol of tertiary octyl phenol and 9 mols of ethylene oxide, and with 7 parts of isopropanol, the said phosphorus compound being of the formula

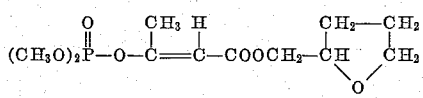

5. An aqueous spraying preparation for combating insect and acaride pests, which comprises 2 parts of a phosphorus compound in admixture with 1 part of the condensation product from 1 mol of tertiary octyl phenol and 8 mols of ethylene oxide, and with 7 parts of isopropanol, the said phosphorus compound being of the formula

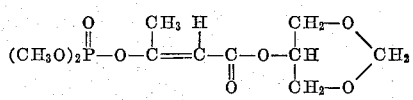

6. The method of controlling insect and acaride pests on plants which comprises applying to plants that are subject to attack by said pests a pesticidal amount of an organic phosphorus compound of the formula

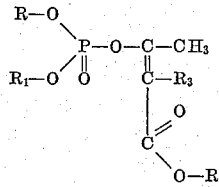

in which R and R$_1$ each is alkyl with 1 to 4 carbon atoms, R$_2$ is a member selected from the group consisting of tetrahydrofurfuryl,

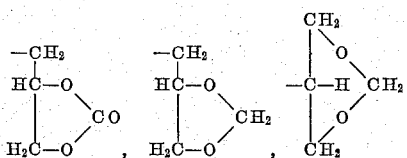

and

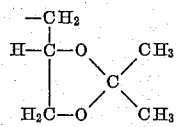

and R$_3$ is a member selected from the group consisting of H and Cl.

7. The method of controlling insect and acaride pests on plants which comprises applying to plants that are subject to attack by said pests a pesticidal amount of an organic phosphorus compound of the formula

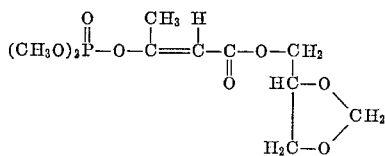

8. The method of controlling insect and acaride pests on plants which comprises applying to plants that are subject to attack by said pests a pesticidal amount of an organic phosphorus compound of the formula

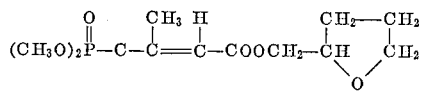

9. The method of controlling insect and acaride pests on plants which comprises applying to plants that are subject to attack by said pests a pesticidal amount of an organic phosphorus compound of the formula

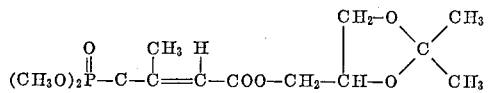

10. The method of controlling insect and acaride pests on plants which comprises applying to plants that are subject to attack by said pests a pesticidal amount of an organic phosphorus compound of the formula

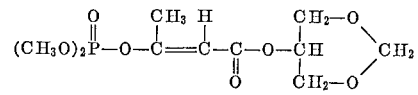

References Cited in the file of this patent
UNITED STATES PATENTS

| | | |
|---|---|---|
| 3,035,079 | Beriger | May 15, 1962 |
| 3,053,729 | Sun | Sept. 11, 1962 |
| 3,055,798 | Beriger | Sept. 25, 1962 |

UNITED STATES PATENT OFFICE
CERTIFICATE OF CORRECTION

Patent No. 3,136,690                                                          June 9, 1964

Ernst Beriger

It is hereby certified that error appears in the above numbered patent requiring correction and that the said Letters Patent should read as corrected below.

Column 9, lines 43 to 50, the formula should appear as shown below instead of as in the patent:

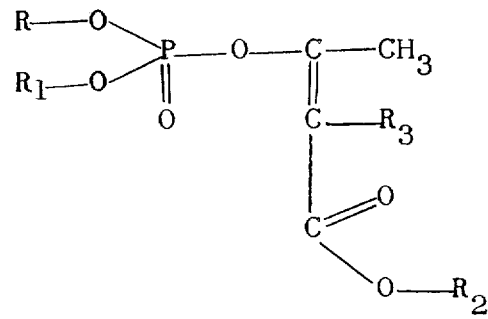

Signed and sealed this 8th day of December 1964.

(SEAL)
Attest:

ERNEST W. SWIDER                                    EDWARD J. BRENNER
Attesting Officer                                   Commissioner of Patents